(12) United States Patent
Hansen et al.

(10) Patent No.: US 10,690,224 B2
(45) Date of Patent: Jun. 23, 2020

(54) TENSIONING PULLEY ARRANGEMENT FOR A BELT DRIVE AND BELT DRIVE HAVING THE TENSIONING PULLEY ARRANGEMENT

(71) Applicant: Ford Global Technologies, LLC, Dearborn, MI (US)

(72) Inventors: Joachim Hansen, Bergisch Gladbach (DE); Stefan Quiring, Leverkusen (DE); Moritz Klaus Springer, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 15/627,721

(22) Filed: Jun. 20, 2017

(65) Prior Publication Data

US 2017/0370448 A1 Dec. 28, 2017

(30) Foreign Application Priority Data

Jun. 24, 2016 (DE) .................. 10 2016 211 405

(51) Int. Cl.
*F16H 7/12* (2006.01)
*F16H 7/08* (2006.01)

(52) U.S. Cl.
CPC ....... *F16H 7/12* (2013.01); *F16H 2007/0802* (2013.01); *F16H 2007/0885* (2013.01)

(58) Field of Classification Search
CPC .. F16H 7/12; F16H 7/1281; F16H 2007/0802; F16H 2007/0806; F16H 2007/0808; F16H 2007/0874; F16H 2007/0885; B25D 17/26

USPC .................................... 474/134, 135
See application file for complete search history.

(56) References Cited

U.S. PATENT DOCUMENTS

| 4,511,348 | A | * | 4/1985 | Witdoek | .................. F16H 7/12 474/109 |
| 6,942,589 | B2 | * | 9/2005 | Rogers | ...................... F16H 7/12 474/134 |
| 7,494,434 | B2 | | 2/2009 | McVicar et al. | |
| 2003/0176249 | A1 | * | 9/2003 | Polster | .................. F16H 7/1209 474/134 |

(Continued)

FOREIGN PATENT DOCUMENTS

| CN | 204646418 U | 9/2015 |
| DE | 10348878 A1 | 5/2004 |

*Primary Examiner* — Michael R Mansen
*Assistant Examiner* — Robert T Reese
(74) *Attorney, Agent, or Firm* — Geoffrey Brumbaugh; McCoy Russell LLP

(57) ABSTRACT

The tensioning pulley arrangement for a belt drive in an engine, is provided. In one example, the tensioning pulley arrangement includes a first tensioning pulley and a second tensioning pulley tensioning a belt with a spring force and a spring preload force generated by a first spring device coupled to the first and second tensioning pulleys. The tensioning pulley arrangement further includes an intensifying device that decreases belt tension during low belt load conditions and increases belt tension during high belt load conditions. In this way, friction losses during low belt loads may be reduced and belt slippage caused by high belt loads and/or dynamic shifts in belt loads may also be reduced.

10 Claims, 6 Drawing Sheets

(56) References Cited

U.S. PATENT DOCUMENTS

| | | | |
|---|---|---|---|
| 2003/0220164 A1* | 11/2003 | Tamai | F16H 7/1281 |
| | | | 474/134 |
| 2004/0077446 A1 | 4/2004 | Manning | |
| 2009/0126662 A1 | 5/2009 | Sellars | |
| 2009/0186726 A1 | 7/2009 | Van Maanen | |
| 2011/0070986 A1* | 3/2011 | Maguire | F02B 67/06 |
| | | | 474/135 |
| 2013/0260932 A1* | 10/2013 | Adam | F16H 7/1218 |
| | | | 474/134 |
| 2015/0051033 A1* | 2/2015 | Replete | F16H 7/1218 |
| | | | 474/117 |
| 2015/0144099 A1* | 5/2015 | Straker | F02N 11/0803 |
| | | | 123/339.14 |
| 2015/0167797 A1* | 6/2015 | Noguchi | F16H 7/1281 |
| | | | 477/3 |
| 2016/0230853 A1* | 8/2016 | Harvey | F02N 15/08 |
| 2017/0138445 A1* | 5/2017 | Farewell | F16H 7/1281 |
| 2017/0306836 A1* | 10/2017 | Replete | F02B 67/06 |
| 2018/0017143 A1* | 1/2018 | Antchak | B60K 25/02 |

* cited by examiner

TENSIONING PULLEY ARRANGEMENT FOR A BELT DRIVE AND BELT DRIVE HAVING THE TENSIONING PULLEY ARRANGEMENT

CROSS REFERENCE TO RELATED APPLICATION

The present application claims priority to German Patent Application No. 102016211405.0, filed Jun. 24, 2016. The entire contents of the above-referenced application are hereby incorporated by reference in its entirety for all purposes.

FIELD

The present description relates generally to a tensioning pulley arrangement for a belt drive and to a belt drive having a tensioning pulley arrangement.

BACKGROUND/SUMMARY

Motor vehicles (e.g., motor cars) typically have a drive train having at least one internal combustion engine for producing driving power. The driving power is usually transmitted to drive wheels of the motor vehicle via a transmission (e.g., an automatic or manual transmission) and a final drive. The internal combustion engine of a motor vehicle is furthermore used to drive auxiliary units. For this purpose, an internal combustion engine usually has a belt drive, which is driven by a belt pulley coupled to a crankshaft of the internal combustion engine.

The belt drive may drive ancillary units of the motor vehicle (e.g., hydraulic pumps, water pumps, air-conditioning compressors and at least one electric generator). To enable a belt of the belt drive to transmit sufficient torque to the auxiliary units to be driven, tensioning devices for the belt may be used. Such tensioning devices usually operate with tensioning pulleys, which are placed against the belt, tensioning the belt with a spring preload, for example.

US 2009/0186726 A1 discloses a tensioning pulley arrangement for a belt drive of a mild-hybrid drive train, said arrangement having two tensioning pulleys, which are guided by means of pivotably mounted levers. At one end, the pivotably mounted levers are connected to a hydraulic piston of a hydraulic unit and, at the other end, they support the tensioning pulley. Additionally, U.S. Pat. No. 7,494,434 B2 discloses a mechanical tensioning pulley arrangement for a belt drive, wherein there is a rocker that can be pivoted relative to the internal combustion engine and which carries a tensioning pulley at one end. Arranged at the other end of the rocker is a pivotably mounted lever, at the free end of which a second tensioning pulley is arranged. The lever is spring-preloaded relative to the rocker. The rocker is likewise spring-preloaded in relation to the internal combustion engine. Tensioning pulley arrangements of this kind must have a high pretension, even in an idling state, in which relatively low forces have to be transmitted by the belt drive, to ensure that sufficiently high pre-tensioning forces are available in the dynamically loaded state to reliably prevent slippage and thus unwanted slip of the belt. However, at low loads the tensioning pulley system may have disadvantageous frictional losses within the belt drive due to excess belt tension. Therefore, previous tensioning systems, such as the systems disclosed US 2009/0186726 and U.S. Pat. No. 7,494,434 may have made disadvantageous trade-offs between dynamic load tensioning to reduce slippage and low load friction losses.

Recognizing the aforementioned problems the inventors developed a tensioning pulley arrangement. In one example, the tensioning pulley arrangement includes a first tensioning pulley and a second tensioning pulley tensioning a belt with a spring force and a spring preload force generated by a first spring device coupled to the first and second tensioning pulleys. The tensioning pulley arrangement further includes an intensifying device that decreases belt tension during low belt load conditions and increases belt tension during high belt load conditions. The intensifying device therefore enables belt slippage to be reduced during high peak loads and dynamic load swings and also reduces friction losses during low belt loads. In this way, the tensioning pulley arrangement may be efficiently operated over a wide range of operating conditions. In one example, the intensifying device may include a second spring device coupled to the first and second tensioning pulleys in parallel with the first spring device, the second spring device providing variable tensioning forces based on the distance between the first and second tensioning pulleys. Thus, when the second spring device is arranged in this manner the belt slippage and friction loss reductions can be achieved by a simple and low cost mechanism.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
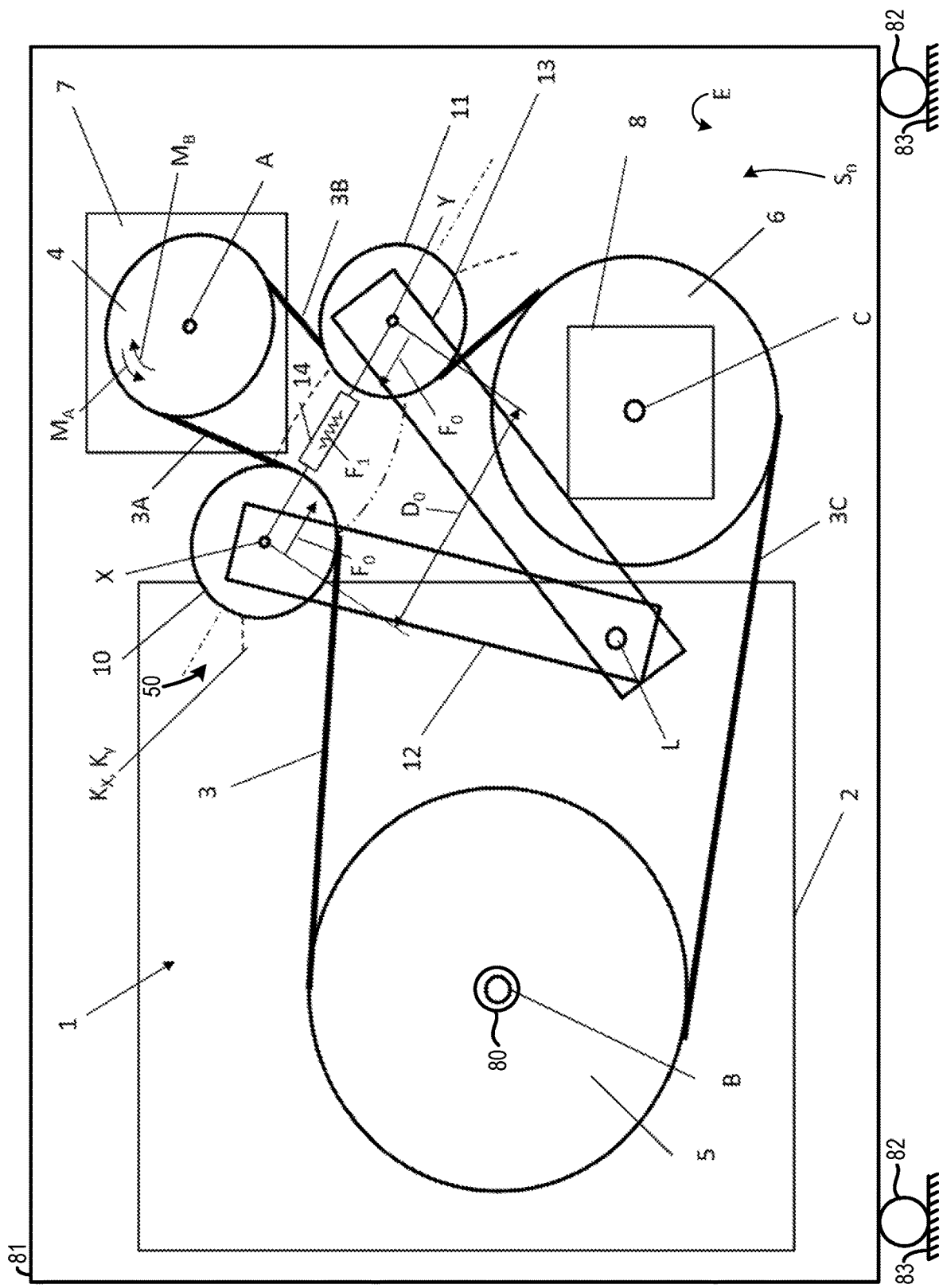
FIG. 1 shows, schematically, a belt drive having a tensioning pulley arrangement.

To reduce the fuel consumption of a motor vehicle, motor vehicles may feed electrically produced driving power into the drive train of a motor car in addition to the driving power of the internal combustion engine. A motor vehicle drive train modified in this way is referred to as a hybrid drive train, since the driving power for the motor vehicle is provided both by burning fossil fuels in the internal combustion engine and by converting stored electrical energy (e.g., by means of an electric motor). A particularly simple way of coupling the electric driving power provided by an electric motor into a hybrid drive train includes replacing the electric generator (alternator), which is usually present in the motor vehicle for the purpose of supplying the latter with electricity, by a motor/generator unit, which can be operated either as a generator or as an electric motor. In the generator mode, a motor/generator unit of this kind is driven by the belt drive of the internal combustion engine. In the motor mode of the electric motor/generator unit, the electric motor/generator unit transmits driving torque to the crankshaft of the internal combustion engine via the belt drive. Here, a change from generator mode to motor mode and vice versa can take place in rapid succession, giving rise to highly dynamic loading of the belt drive. In one operating phase, for example, the electric motor/generator unit can act as a drive motor to assist the internal combustion engine. If the vehicle is in a different operating state (e.g., is being braked) the electric motor/generator unit can be switched without delay to generator mode and can thus assist the brakes of the vehicle while producing electric energy. This results in a highly dynamic loading scenario for the belt drive, which makes increased demands on tensioning devices for the belt of the belt drive. The drive trains described above may be referred to as "mild-hybrid drive trains" and characteristically exhibit significantly higher loading of the belt drive in comparison with a traditional drive train. These higher loads furthermore occur in both directions since an electric motor/generator unit can act on the belt of the belt drive both in a driving mode (motor mode) and a braking mode (generator mode).

Another trend for saving fuel is the increasing development of internal combustion engines with a smaller number of cylinders at a higher specific torque, as a result of which the dynamic loads on the belt drive are additionally increased.

To address at least the high loads on the belt drive and/or large changes in the belt drive loads a tensioning pulley arrangement for a belt drive has been developed. The mechanical tensioning pulley system may be of simple construction and of low cost and may be capable of allowing dynamic peak loads and highly dynamic load changes within a belt drive without the occurrence of unwanted slip, is described herein. Moreover, the tensioning pulley system may also enable the belt tension to be low (e.g., minimized) at low loads or low load levels of the belt drive in order to avoid disadvantageous frictional losses within the belt drive.

The tensioning pulley arrangement may include at least two tensioning pulleys, wherein a first tensioning pulley is rotatable about an axis X and a second tensioning pulley is rotatable about an axis Y. The X axis may be referred to as a first axis and the Y axis may be referred to as a second axis or vice versa. The first tensioning pulley interacts with a strand of a belt, of a belt of the belt drive, tensioning said strand. Additionally, the second tensioning pulley interacts with a second strand of the belt of the belt drive, tensioning said strand. The axes X and Y are parallel to one another and can be moved at a constant or variable distance D from one another along path contours $K_x$ and $K_y$, which extend parallel to a plane E perpendicular to the axes X, Y. The tensioning pulleys are placed against the belt with a spring force F and a spring preloading relative to one another by means of at least one first spring device F1, and the axes X, Y are arranged at a distance $D_0$ from one another in an initial position $S_0$. A tensioning pulley arrangement of this kind may be distinguished by the fact that the tensioning pulley arrangement has at least one intensifying device for increasing the spring force F, wherein (a) the intensifying device may include at least one second spring device F2, which is connected in parallel with the first spring device F1 and, in the event of an increase $\Delta D$ in the distance D between the axes X and Y, may be designed to increase the spring force F, wherein the second spring device F2 is relaxed in the initial position $S_0$, and/or (b) the intensifying device may include a tensioning device, which tensions the at least one first spring device F1, in the event of a movement of a central point M of the distance D from its rest position $M_0$, with increasing movement of the central point M, wherein the first spring device F1 may be formed by at least one first spring F1' and at least one second spring F1'', arranged in series. The tensioning device may be a crank, wherein the springs F1' and F1'' are coupled in each case by one of their ends to one of the axes X and Y and are coupled to the crank by means of the respective other ends, and the crank can be moved in the event of a movement of the central point M out of its rest position $M_0$, tensioning the springs F1' and F1''.

It has thus been recognized that it is expedient, for the purpose of reducing frictional losses (e.g., minimizing friction losses) in the belt drive and providing reliable and as far as possible slip-free operation of the belt drive to make the belt pretension for an idling operating state (initial position $S_0$), characterized by a low belt force, low (e.g., as low as possible), but also to ensure that the belt pretension grows proportionately, in particular to a disproportionately greater extent, with respect to a belt force that varies with time. These benefits may be achieved by the intensifying device in the abovementioned variant (a) and/or (b) of the tensioning pulley arrangement.

In the tensioning pulley arrangement described herein, an increase $\Delta D$ in the distance D between the axes X and Y may take place, starting from an initial position $S_0$ of the axes X, Y of the tensioning pulleys, when there is a change in the belt force owing to dynamic processes in the belt drive. In one example, a second spring device F2, which is arranged in parallel with the first spring device F1, may be used as an intensifying device in variant (a). If a change $\Delta D$ in the distance D between the axes X and Y takes place, there is tensioning of spring device F1 and additionally tensioning of spring device F2, which assists spring device F1, with the result that in total a higher spring force F1+F2 acts on the tensioning pulleys. Thus, the intensifying device of arrangement (a) may make it possible to choose the belt tensioning force by means of the first spring device F1 in the idling mode (e.g., in an initial position $S_0$) to be at a level just sufficient for the idling mode. It is thereby possible to keep the frictional losses low. However, as soon as an increase $\Delta D$ in the distance is induced in the belt drive owing to dynamic load changes, the second spring device F2 may intervene with an intensifying effect and thus increases the pretensioning force of the tensioning pulleys on the belt, thereby ensuring that even high torque peaks that occur in a highly dynamic way can be transmitted reliably without slip by the belt. Additionally in one example, the second spring device F2, in variant (a), may be under no load in the idling state. It is thereby possible, in one example, to ensure in a simple way that the belt pretension is brought about by a first spring device F1, in particular a first spring device provided with a relatively low spring constant, and that the second spring device F2, which may have a higher spring stiffness than the first spring device F1, may be used only in the case of dynamic loads.

In a variant (b), the intensifying device may be designed as a tensioning device for the first spring device F1, which exploits a movement of a central point M of the distance D from a rest position $M_0$ into a displaced position to tension the first spring device F1 with increasing movement of the central point M. Such a displacement of the central point M may occur when there is varying (e.g., dynamically changing) belt forces during the operation of the belt drive. The intensifying device described herein may exploit this movement of the central point M of the distance D out of the rest position $M_0$ thereof to tension the spring device F1 to a disproportionately great extent using a tensioning device. In such an example, it may be possible to keep the tensioning forces low in an idling state with low belt forces in order to reduce (e.g., minimize) frictional losses. Moreover, it is possible, in one example, by means of a disproportionate intensifying effect on the spring force of spring device F1, to make adequate provision for a high belt pretension in the dynamic load case so that slip-free operation of the belt drive is possible despite high load peaks with highly dynamic variation. Moreover, it is possible, in one example, to bring about a movement of the central point M out of the rest position $M_0$ into a spring tension of spring device F1 which increases disproportionately and thus into a disproportionate increase in the forces F with which the pulleys are placed against the belt.

In another example, the belt may be wrapped at least partially around a belt pulley along its path between the tensioning pulleys, where the belt pulley has an axis of rotation A parallel to the axes X and Y and where the belt pulley may be subjected to a driving torque $M_A$ or a braking torque $M_B$. Such an arrangement of the tensioning pulley may be in direct proximity around the belt pulley (e.g., that of the electric motor/generator unit) may be of particular advantage since influencing of the belt tension may take place directly adjacent to a belt pulley from which highly dynamic fluctuations in the belt force emanate.

In another example, the second spring device F2 may be coupled to at least one of the tensioning pulleys via a ratchet device. This can makes it possible to compensate any belt stretching which occurs in the event of prolonged operation of the belt drive and to compensate a change in the initial position $S_0$ of the tensioning pulleys relative to one another resulting from said stretching. The ratchet device enables the second spring device S2 to have a rapid (e.g., immediate) assisting effect upon the occurrence of dynamic loads, even when there is a change in the initial distance $D_0$ between the tensioning pulleys, due to belt stretching.

In yet another example, the crank may be supported by a lever in such a way as to be pivotable about an axis H fixed relative to the belt drive. In this way, a simple construction of the tensioning device may be achieved.

In another example, it may furthermore be expedient to arrange the tensioning pulleys in such a way that they can be pivoted about an axis L fixed relative to the belt drive by links. It is thereby possible to achieve effective mechanical implementation of tensioning device with a simple design.

In another example, it may furthermore be expedient for the path contours $K_x$, $K_y$ to be arc-shaped, in particular circular-arc-shaped. Such a geometry of the path contours $K_x$; $K_y$ can be implemented mechanically in a particularly simple way.

Alternatively, in one example, the axes X and Y may be guided along a straight path contour $K_x$ and $K_y$ (e.g., by means of linear guides). Such guidance of the axes X and Y may be expedient in order, for example, to improve an installation space that is to be provided between the axes X and Y for the arrangement of the spring devices F1 and/or F2.

In another example, path contour $K_x$ and path contour $K_y$ may be equal. It is thereby possible to make the mechanical suspension of the tensioning pulleys, which are movable along the path contours $K_x$ and $K_y$ about the axes X and Y, particularly simple.

Another mechanically simple design, may include choosing the axis A of the belt pulley of the electric motor/generator unit as the axis L of the links.

It may be furthermore advantageous if the axis A of the belt pulley is chosen as the pivoting axis H of the lever, in one example. In such an example, an integrated construction of the tensioning pulley arrangement in the electric motor/generator unit is made possible in a particularly simple manner. Such an arrangement may reduce the required assembly effort since the electric motor/generator unit can already be supplied as a preinstalled subassembly containing the tensioning pulley arrangement described herein as an integrated subassembly. As a result, manufacturing cost may be decreased.

In another example, the first spring device F1 may have a lower spring constant than the second spring device F2, wherein the first spring device F1 may be designed to apply a predetermined initial spring force $F_0$ (e.g., required initial spring force) while allowing for tolerances and friction in the initial position $S_0$. By means of a lower spring constant of spring device F1 in comparison with the second spring device F2 (i.e., by providing a spring F1 which is softer than spring device F2), the predetermined initial spring force $F_0$ (e.g., required initial spring force) may be adjusted in a particularly sensitive manner. With a lower spring constant, a loss of spring force in the event of belt lengthening, which may occur in prolonged operation of the belt drive, is furthermore of smaller magnitude.

In another example, the first spring device F1 and/or the second spring device F2 may have a spring damper arrangement. It is thereby possible to damp dynamic oscillations in the belt drive and to reduce slip (e.g., avoid slip) under highly dynamic loads.

FIG. 1 shows a belt drive 1 for a drive unit 2 (e.g., an internal combustion engine) of a motor vehicle 81. The motor vehicle 81 includes wheels 82 on a driving surface 83. Motive energy may be delivered to the wheels 82 by the drive unit 2. In the depicted example, an electric motor/generator unit 7 may also provide motive energy to the wheels 82 and the vehicle 81 may therefore be a hybrid vehicle. However, in other examples, the vehicle 81 may not include the electric motor/generator unit 7. The belt drive 1 has a belt 3 (e.g., a flat belt) which is in each case wrapped at least partially around a plurality of belt pulleys 4, 5, 6. A first belt pulley 4 is assigned to the electric motor/generator unit 7 and may be rotated about an axis of rotation A. A second belt pulley 5 is assigned to a crankshaft 80 of the drive unit 2 and may be rotated about an axis of rotation B. The crankshaft 80 may delivery rotational input to the wheels 82 via a transmission, in one example. A third belt pulley 6 can be rotated about an axis C and is assigned to an ancillary unit 8 (e.g., a hydraulic pump or a coolant pump). There may be further belt pulleys for further units that may be driven by means of the belt 3. A first strand 3A of the belt 3 runs between the first belt pulley 4 and the second belt pulley 5. A second strand 3B of the belt 3 runs between the first belt pulley 4 and the third belt pulley 6. A third strand 3C runs between the third belt pulley 6 and the second belt pulley 5.

A tensioning pulley arrangement 50 is also illustrated in FIG. 1. The tensioning pulley arrangement 50 is included in the belt drive 1. The tensioning pulley arrangement 50 includes a first tensioning pulley 10, a second tensioning pulley 11, and an intensifying device. In the first variant of the tensioning pulley arrangement 50, shown in FIG. 3A, the intensifying device may include a second spring device F2. However, in the second variant of the tensioning pulley arrangement 50, shown in FIG. 4A, the intensifying device may include tensioning device 40 including a crank 41 connected to a lever 42.

Returning to FIG. 1, the first tensioning pulley 10 is placed against the first strand 3A of the belt 3 so as to be rotatable about an axis of rotation X, tensioning said strand. Likewise, the second tensioning pulley 11 is placed against the second strand 3B so as to be rotatable about an axis of rotation Y, tensioning said strand. Thus, the first tensioning pulley 10 and/or the second tensioning pulley 11 may interact with the belt 3 to tension said belt. The X axis may be referred to as a first axis and the Y axis may be referred to as a second axis, or vice versa, in one example. Additionally, the axes of rotation A, B, C, X and Y are parallel to one another and, in the illustration according to FIG. 1, extend perpendicularly to a plane E, which is aligned parallel to the plane of the drawing of FIG. 1. Furthermore, the axis of rotation A may be referred to as a third axis of rotation. However, the numbering of the axes may be changed, in other examples.

The first tensioning pulley 10 is connected to a first link 12. The second tensioning pulley 11 is connected to a second link 13. As shown in FIG. 1, the links 12 and 13 are mounted in such a way that they can be pivoted independently of one another about an axis L fixed relative to the belt drive 1, thus allowing the axes of rotation X, Y to be moved along an arc-shaped path contour $K_x$, $K_y$. As shown in FIG. 1, the path contours $K_x$, $K_y$ are identical. The path contours $K_x$ and $K_y$ can also be designed differently in respect of their position and path contour shape. For this purpose, the links 12, 13 can be of different length, for example, or can be mounted pivotably on different axes L. In one particular example, the fixed axis L, which forms the pivoting axis for the links 12, 13, may coincide with the axis of rotation A of the first belt pulley 4.

To tension the belt 3, the tensioning pulleys 10, 11 may be placed against the belt 3 and may be spring preloaded by means of an actuating device 14. For this purpose, the actuating device 14 has at least one first spring device F1. Thus, the actuating device 14 may be configured to generate a spring preload force and a spring force.

In an initial position of the belt drive 1, in accordance with FIG. 1, the axes of rotation X, Y of the tensioning pulleys 10, 11 are at an initial distance $D_0$ from each other. In this initial position $S_0$, the tensioning pulleys 10, 11 are each placed against the belt 3 with an initial spring force $F_0$ (e.g., predetermined initial spring force).

The initial position $S_0$, shown in FIG. 1, of the belt drive 3 can either be an arrangement in the stationary condition of the belt drive 1 or an arrangement which establishes itself in a certain defined idling state of the belt drive 1 (e.g., in a state with the belt 3 running).

During the operation of the belt drive 1, the belt 3 is in reality subject to dynamic tension force fluctuations (e.g., highly dynamic force fluctuations), which may result from different operating states of the units and/or ancillary units driven by the belt 3. For example, the electric motor/generator unit 7 can input a driving torque $M_A$ into the belt drive 1 in the electric motor mode. Similarly, the electric motor/generator unit 7 can input a braking torque $M_B$ into the belt drive 1 in the generator mode. Furthermore, the belt pulleys 5, 6 can provide rotational input (e.g., torque) to the belt drive 1 which changes dynamically over time. The torque inputs into the belt drive 1 may be either braking or driving torques. To define the initial force $F_0$, a defined operating state of the belt drive 1 may be preselected to reduce belt slip (e.g., designed to ensure that belt runs without slip or virtually without slip). Here, the initial spring force $F_0$ and thus the design of the first spring device F1 may be such that the initial spring forces $F_0$ on the tensioning pulleys 10, 11 are large enough to produce a belt tension of the belt 3 which is sufficient for this initial position $S_0$. Here, the initial spring force $F_0$ chosen may be small (e.g., as small as possible) so as to produce the decreased frictional forces (e.g., minimized frictional forces) in a defined idling state of this kind and thus to allow energy-saving operation of the belt drive 1.

Figure 2:
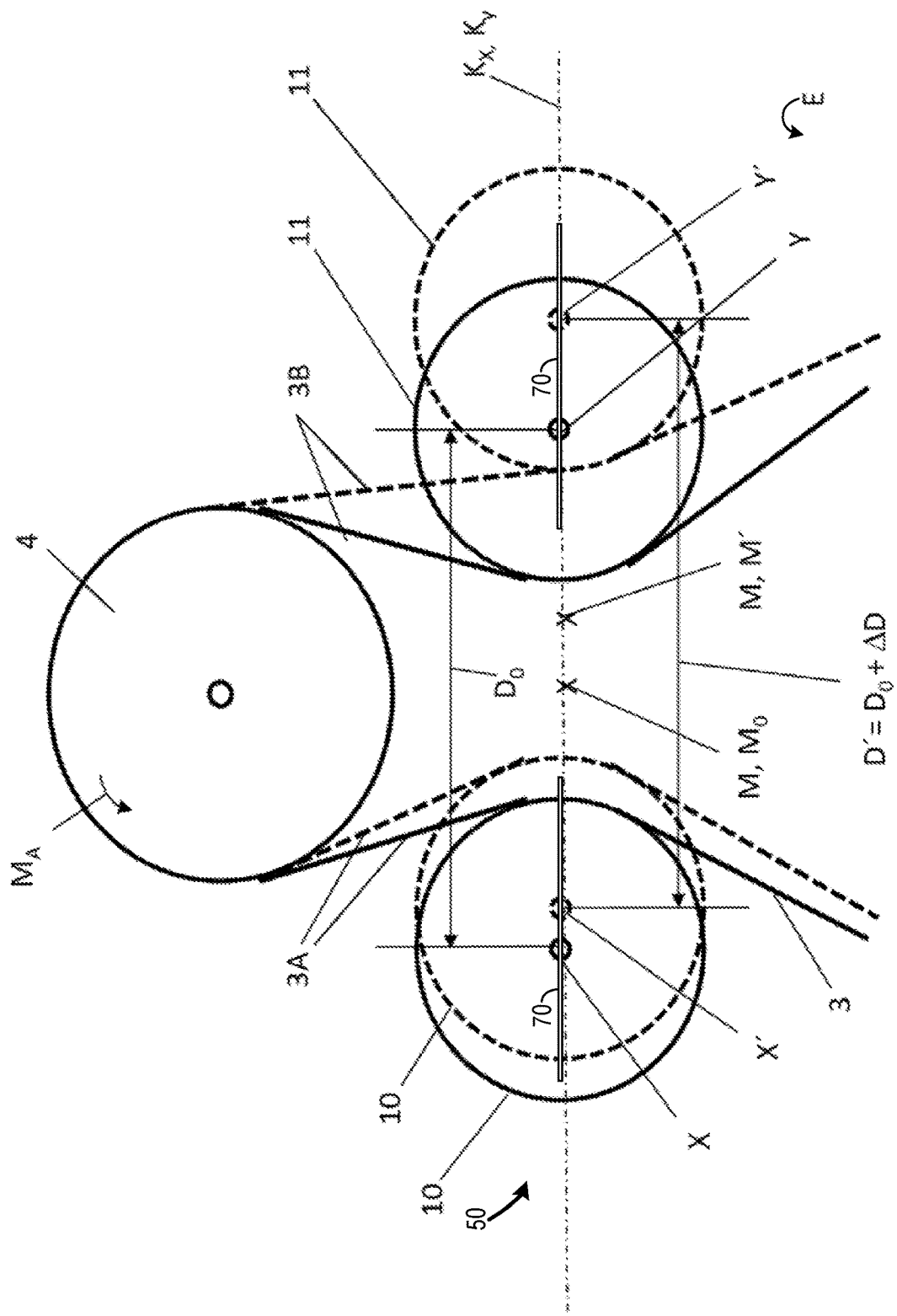
FIG. 2 shows, schematically, an increase $\Delta D$ in the distance between the axes X and Y and a movement of the central point M out of its rest position $M_0$ in the case of dynamic belt loads.

FIG. 2 schematically shows a change in the position of the tensioning pulleys 10, 11 with modified operating forces in the belt 3 (illustration in dashes) in comparison with the position of the tensioning pulleys 10, 11 in the initial position $S_0$ (solid lines).

In the idling state (initial position $S_0$), the axes of rotation X, Y are at a distance $D_0$ from one another (see also FIG. 1). A central point M of the distance between the axes of rotation X and Y is in an initial position $M_0$. If a driving torque $M_A$ is now applied to the first belt pulley 4, for example, the second strand 3B is tensioned more strongly. This causes a movement of the second tensioning pulley 11 to the right in the illustration according to FIG. 2. The axis of rotation Y thereof shifts with the second tensioning pulley 11 into the position Y'. The first tensioning pulley 10 shifts from its initial position (solid line) to the right in the illustration according to FIG. 2 into the position shown in dashes, wherein the axis of rotation X thereof is moved into the position X'. A distance D' between the axes of rotation X and Y in the deflected position X' and Y' thereof is increased relative to the distance $D_0$ by an increase ΔD in distance. At the same time, a movement of the central point M out of its position $M_0$ into the position M' takes place. Such a movement is directed to the right in the illustration according to FIG. 2. The illustration according to FIG. 2 shows only an illustrative arrangement of the positions and distances in the case of a dynamic load. Of course, the magnitudes and directions of the movement and the changes in the distances are dependent on the dynamic loads acting in the belt 3. FIG. 2 is intended to illustrate that both a movement of the central point M and a change in the distance between the axes of rotation X and Y of the tensioning pulleys 10 and 11 in the tensioning pulley arrangement 50 takes place owing to dynamic load changes in the belt drive 1.

A combined movement of this kind is illustrated schematically in FIG. 2 by means of straight-line path contours $K_x$ and $K_y$. Such straight-line path contours $K$, $K_y$ can be achieved, for example, if the tensioning pulleys 10, 11 or the axes of rotation X, Y thereof are guided relative to the unit 2 by means of linear guides 70.

Both effects (e.g., both a change (ΔD) in the distance between the axes of rotation X and Y and a movement of the central point M out of its initial position $M_0$) are exploited by tensioning pulley arrangement 50 in order to intensify the spring force F of the at least one spring device F1 by means of an intensifying device.

Figure 3A:
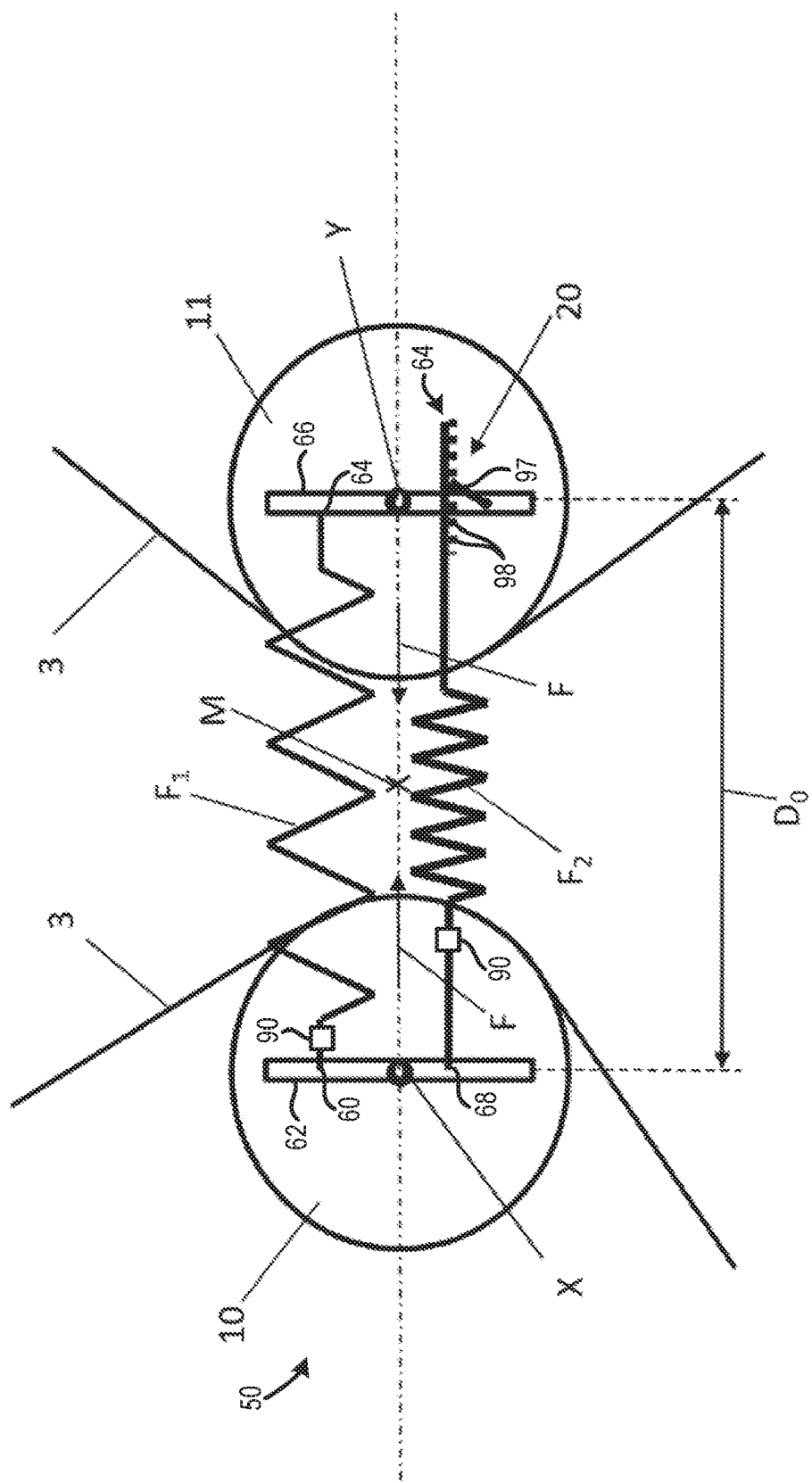
FIG. 3A shows, schematically, a first example of the intensifying device (variant (a)).
Figure 3B:
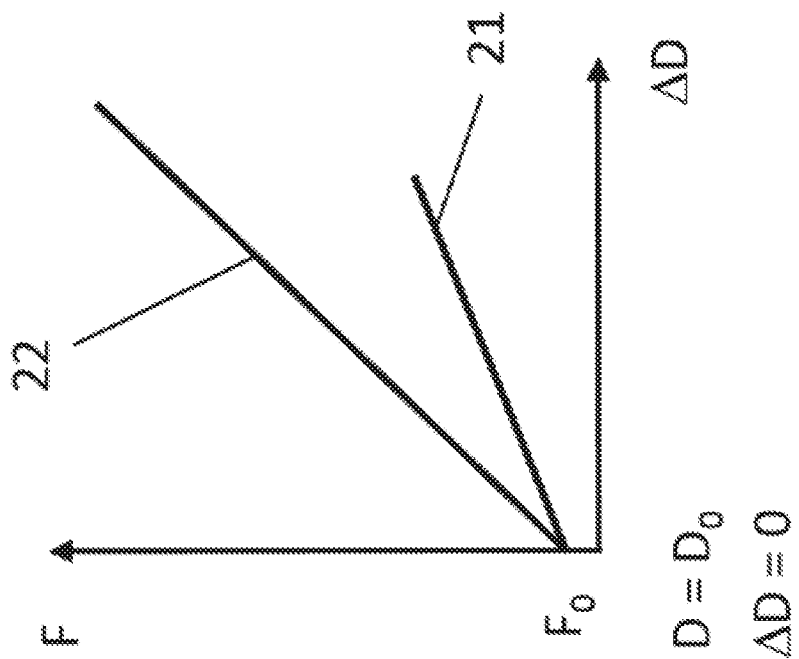
FIG. 3B shows, schematically, force profiles of the spring force F as a function of a change $\Delta D$ in the distance between the axes X and Y.

A first variant of the tensioning pulley arrangement, shown in FIGS. 3A and 3B, may use the effect of the change ΔD in the distance D between the axes of rotation X, Y. To achieve this, the intensifying device may be designed as a second spring device F2 connected in parallel with the first spring device F1. Here, the first spring device F1 is in each case coupled at both ends to the axis of rotation X and to the axis of rotation Y of the tensioning pulleys 10 and 11. Specifically, the first spring device F1 includes a first end 60 coupled to a first attachment arm 62 coupled (e.g., fixedly or pivotally coupled) the tensioning pulley 10 at the axis of rotation X. Additionally, the first spring device F1 includes a second end 64 coupled to a second attachment arm 66 coupled (e.g., fixedly or pivotally coupled) to the tensioning pulley 11 at the axis of rotation Y.

As shown in FIG. 3A, the second spring device F2 is coupled at one end to the axis of rotation X of tensioning pulley 10 and, at the other end, to the axis of rotation Y of tensioning pulley 11 via a ratchet device 20. In particular, the second spring device F2 includes a first end 68 coupled to the first attachment arm 62 and the ratchet device 20 to the second attachment arm 66.

The first end 60 of the first spring device F1 and the first end 68 of the second spring device F2 are coupled to opposing sides of the first attachment arm 62. Likewise, the second end 64 of the first spring device F1 and the ratchet device 20 are coupled to opposing sides of the second attachment arm 66. The first attachment arm 62 and the second attachment arm 66 may be conceptually divided into sides using the axis of rotation X and axis of rotation Y, respectively, as side-dividing boundaries, in one example.

When the distance D between the axes of rotation X and Y increases, the ratchet device 20 may be configured to lock, with the result that, when this distance D increases, spring device F2 brings about an additional spring force owing to its connection in parallel with spring device F1. The effective spring force F with which the tensioning pulleys 10, 11 are placed against the belt 3 is thus the sum of the forces of the spring devices F1 and F2. The ratchet device 20 may also be configured to unlock when the tension on the spring device F2 is below a threshold value, in one example. In the depicted example, the ratchet device 20 includes a pawl 97 and a plurality of teeth 98, enabling the aforementioned locking and/or unlocking functions. However, in other examples, other mechanisms enable the locking and/or unlocking features may be used.

In the initial position $S_0$ (distance $D_0$), the second spring device F2 is relaxed, with the result that the effective initial spring force $F_0$ in the initial position $S_0$ is provided exclusively by the first spring device F1. The first spring device F1 thus ensures a low tension (e.g., minimum tension) in the belt 3 in the initial position $S_0$ (distance $D_0$) and thus makes available a sufficient pretension in the belt 3 for a load case in the initial position $S_0$ (distance $D_0$). If there is lengthening of the belt 3 over time, the distance $D_0$ chosen in the initial position ($S_0$) must be smaller in order to obtain the required pretension in the belt 3. This is enabled by the first spring device F1, wherein the ratchet device 20 decouples the second spring device F2 from at least one of the tensioning pulleys 10, 11 by a ratchet action in the case of a decrease in the distance to a value less than $D_0$. If, starting from a reduced initial distance $D_0$, there is once again an increase in said distance during the operation of the belt drive 1, the ratchet device 20 locks, as a result of which the second spring device F2 acts in parallel with the first spring device F1.

The mode of operation of the first variant of the tensioning pulley arrangement is shown by FIG. 3B in the form of a diagram, in which changes ΔD in the distance between the axes of rotation X and Y are plotted on the abscissa. The resulting force F with which the tensioning pulleys 10, 11 are placed against the belt 3 is plotted on the ordinate. In an initial position (ΔD=0; D=$D_0$), the pre-tensioning force has the value $F_0$ (see also FIG. 1).

FIG. 3A also shows the first spring device F1 and the second spring device F2 each having a spring damper arrangement 90 (e.g., hydraulic damper) configured to dampen spring oscillations. It is thereby possible to damp dynamic oscillations in the belt drive and to avoid slip under highly dynamic loads. However, in other examples, only one of the first spring device F1 and the second spring device F2 may have a spring damper arrangement or the spring damper arrangements may be omitted. Further, in other examples, the spring damper arrangement may be included in the spring devices included in the second variant of the tensioning pulley arrangement, shown in FIG. 4A.

Referring to FIG. 3B, a first graph 21 shows the force F as a function of the change ΔD in the distance in the case where only the first spring device F1 is present. The second graph 22 gives a qualitative view of the change in the force F against the change ΔD in distance, wherein the second spring device F2 acts in addition to the first spring device F1, intensifying the latter. Starting from the idling pre-tensioning force $F_0$, the second graph 22 changes more steeply than the first graph 21, with the result that, for a particular change ΔD, an increased force F can be brought about relative to the comparable value for graph 21.

A second variant of the tensioning pulley arrangement 50 (FIGS. 4A-4B) uses a movement of the central point M between the axes of rotation X and Y of the tensioning pulleys 10, 11. Such a movement of the central point M from an initial position $M_0$ toward a central point M in an operating position in accordance with FIG. 4A may take place when, for example, the belt force in strand 3B of the belt 3 is increased relative to the initial position $M_0$. Tensioning pulley 11 and the axis of rotation Y thereof is thereby moved to the right in the illustration according to FIG. 4A. If this occurs, tensioning pulley 10 and the axis of rotation X thereof is also moved by a certain amount to the right along its path contour $K_x$ because tensioning pulley 10 is coupled to tensioning pulley 11 by the first spring device F1.

Figure 4A:
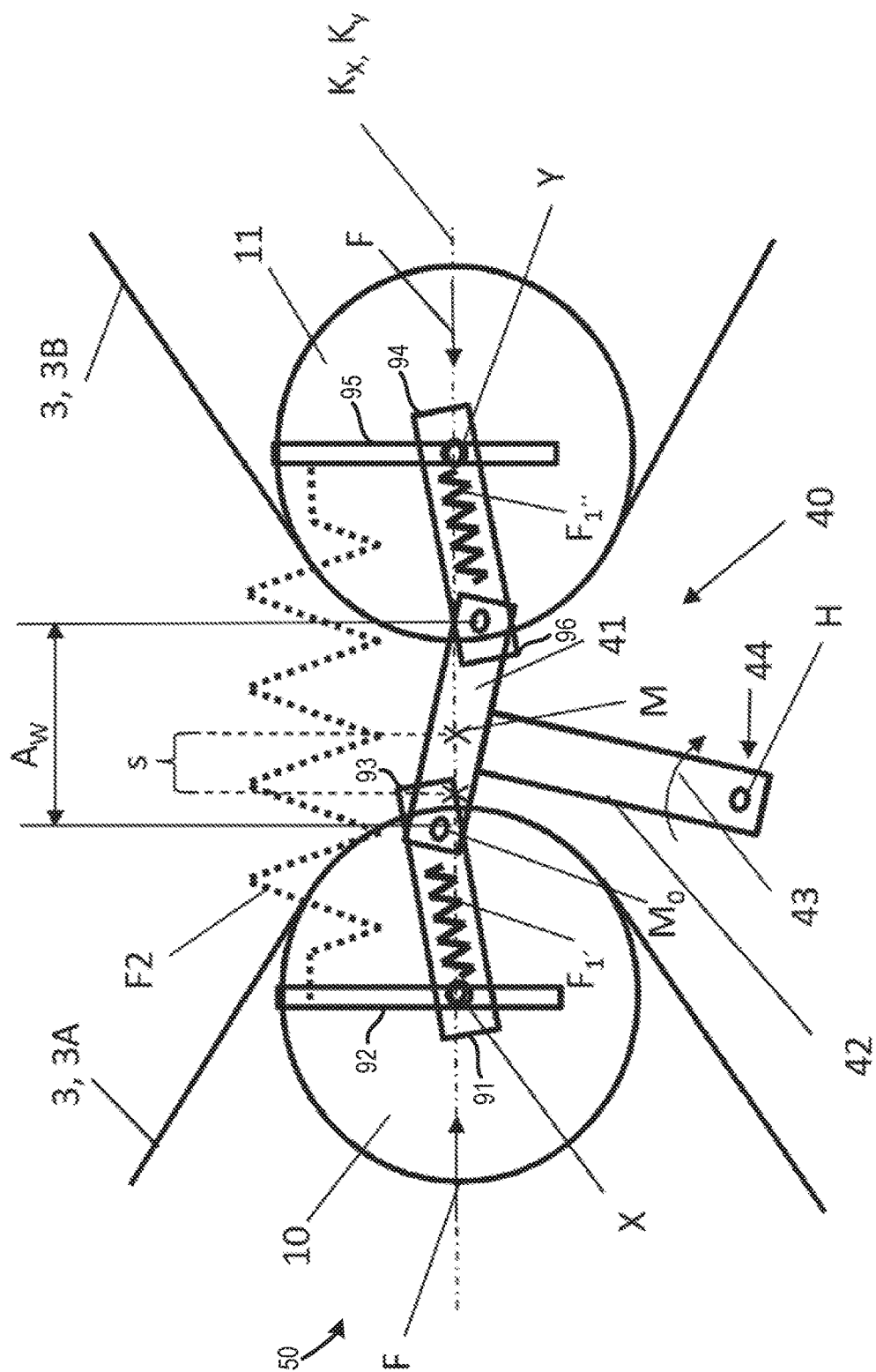
FIG. 4A shows, schematically, a second alternative example of the tensioning pulley arrangement, wherein the intensifying device is designed as a tensioning device, (variant (b)).

In the second variant of the tensioning pulley arrangement 50, shown in FIG. 4A, there is a tensioning device 40 as an intensifying device. The tensioning device 40 is configured to increase the spring force F, by using the spring device F1 that can be tensioned in accordance with the movement of the central point. Arranged in series, the first spring device F1 has a first spring F1' and a second spring F1". The first spring F1' is coupled at one end 91 to the axis of rotation X. Specifically, in the depicted example, the first spring F1' is coupled to a first attachment arm 92 coupled to the first tensioning pulley 10 at the axis of rotation X. In particular, the first spring F1' is coupled to the first attachment arm 92 at the axis of rotation X. On the other hand, the first spring F1' is coupled to a crank 41 at a crank-facing end 93.

The second spring F1" is coupled at one end 94 to axis of rotation Y via a second attachment arm 95 coupled to the second tensioning pulley 11 at the axis of rotation Y. In particular, the second spring F1" is coupled to the second attachment arm 95 at the axis of rotation Y. On the other hand, the second spring F1" is coupled to the crank 41 at a crank-facing end 96.

The axes of rotation X and Y of the tensioning pulleys 10, 11 are thus connected to one another via an in-series arrangement of the first spring F1', the crank 41, and the second spring F1". The crank 41 is connected to a lever 42, wherein the lever 42 is mounted so as to be pivotable about a pivoting axis H in the region of a free end 44. The pivoting axis H is fixed relative to the belt drive 1 and is aligned parallel to the axes of rotation X and Y.

The spring hardnesses (e.g., spring constants) of the springs F1' and F1" may be the same. When the central point M moves out of its rest position $M_0$, the crank is pivoted together with the lever 42 in arrow direction 43.

Owing to the pivoting of the crank 41 in arrow direction 43, an effective distance $A_W$ between attachment points of the springs F1' and F1" on the crank 41 may be reduced with increasing movement of the central point M. As a result, the springs F1' and F1" undergo an extension, increasing the resulting force F of the tensioning pulleys 10, 11 on the belt 3. In this variant of the tensioning pulley arrangement, the springs F1' and F1" thus form the first spring device F1, which is progressively tensioned by the tensioning device 40 formed by the crank 41 and the lever 42 during a movement of a central point M out of its rest position $M_0$.

Figure 4B:
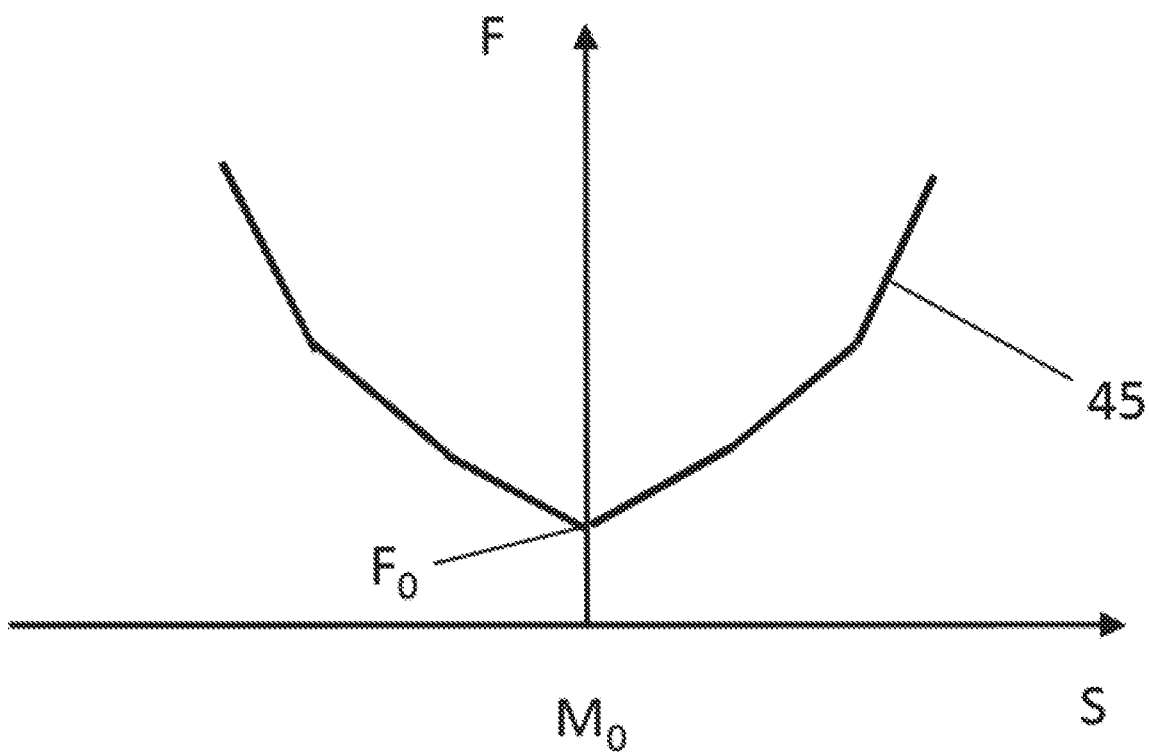
FIG. 4B shows, schematically, a force profile of the spring force F as a function of the movements of the central point M from its zero position $M_0$.

As an option, it is possible in variant (b), shown in FIG. 4B, for the second spring device F2 to be arranged parallel to the first spring device F1 (e.g., parallel to the spring F1') the crank 41 and the second spring F1", similarly to the first variant (a).

FIG. 4B shows a diagram in which a deflection s of the central point M starting from an initial position $M_0$ is plotted on the abscissa. The resulting force F with which the tensioning pulleys 10, 11 are placed against the belt 3 is plotted on the ordinate. In the initial position $M_0$, the first spring device F1 is arranged under a pretension with a force $F_0$. A graph 45 gives a qualitative view of the profile of the force F of the first spring device F1 according to variant (b) as a function of the deflection s of the central point M out of its initial position $M_0$. The first spring device F1 having the tensioning device 40 has a progressive characteristic.

By means of the tensioning pulley arrangement described herein it is possible by simple means to adapt a belt tension of a belt 3 of a belt drive 1 to highly dynamic load changes within the belt drive without the occurrence of unwanted slip. In one example, a pre-tensioning force $F_0$ with which tensioning pulleys are placed against a belt 3 is intensified by exploiting the fact that both a change in the distance between the tensioning pulleys and a movement of a central point M between axes of rotation X, Y of the tensioning pulleys take place in the case of dynamically varying belt loads.

The invention will further be described in the following paragraphs. In one aspect, a tensioning pulley arrangement for a belt drive is provided, the tensioning pulley arrangement comprising a first tensioning pulley rotatable about a first axis, the first tensioning pulley interacting with a first strand of a belt of the belt drive to tension the first strand; and a second tensioning pulley rotatable about a second axis, the second tensioning pulley interacting with a second strand of the belt to tension the second strand; where the first and second axes are parallel to one another and can be moved at a constant or variable distance from one another along path contours, which extend parallel to a plane perpendicular to the first and second axes; where the first and second tensioning pulleys are placed against the belt with a spring force and a spring preloading relative to one another by a first spring device, and the first and second axes are arranged at a distance from one another in an initial position; where the tensioning pulley arrangement has an intensifying device for increasing the spring force; and where the intensifying device includes, a second spring device, which is connected in parallel with the first spring device and, in the event of an increase in the distance between the first and second axes and, is designed to increase the spring force and where the second spring device is relaxed in the initial position, or a tensioning device, which tensions the first spring device to an increasing extent, in the event of a movement of a central point of the distance from its rest position, with increasing movement of the central point, where the first spring device has a first spring and a second spring, arranged in series, and the tensioning device includes a crank, where the first spring and the second spring are coupled in each case by one of their ends to one of the first and second axes and are coupled to the crank by crank-facing ends, and the crank is configured to move in the event of a movement of the central point out of its rest position, tensioning the first spring and the second spring.

In another aspect, a belt drive is provided, the belt drive comprising a tensioning pulley arrangement including; a first tensioning pulley rotatable about a first axis and the first tensioning pulley interacting with a first strand to tension the first strand; and a second tensioning pulley rotatable about a second axis, and the second tensioning pulley interacting with a second strand of a belt of the belt drive to tension the second strand; where the first and second axes are parallel to one another and can be moved at a constant or variable distance from one another along path contours, which extend parallel to a plane perpendicular to the first and second axes; where the first and second tensioning pulleys are placed against the belt with a spring force and a spring preloading relative to one another by a first spring device, and the first and second axes are arranged at a distance from one another in an initial position; where the tensioning pulley arrangement has an intensifying device for increasing the spring force; and where the intensifying device includes, a second spring device, which is connected in parallel with the first spring device and, in the event of an increase in the distance between the first and second axes and, is designed to increase the spring force, where the second spring device is relaxed in the initial position, or a tensioning device, which tensions the first spring device to an increasing extent, in the event of a movement of a central point of the distance from its rest position, with increasing movement of the central point, where the first spring device has a first spring and a second spring, arranged in series, and the tensioning device is a crank, where the first spring and the second spring are coupled in each case by one of their ends to one of the first and second axes and are coupled to the crank by crank-facing ends, and the crank is configured to move in the event of a movement of the central point out of its rest position, tensioning the first spring and the second spring.

In another aspect, a tensioning pulley arrangement is provided, the tensioning pulley arrangement comprising a first tensioning pulley and a second tensioning pulley tensioning a belt with a spring force and a spring preload force generated by a first spring device coupled to the first and second tensioning pulleys; and an intensifying device including; a second spring device connected to the first and second tensioning pulleys in parallel with the first spring device.

In any of the aspects or combinations of the aspects, the belt may be wrapped at least partially around a belt pulley along its path between the first and second tensioning pulleys, where the belt pulley has an axis of rotation parallel to the first and second axes and where the belt pulley is configured to be subjected to a driving torque or a braking torque.

In any of the aspects or combinations of the aspects, the crank may be supported by a lever such that the lever is pivotable about a lever pivot axis fixed relative to the belt drive.

In any of the aspects or combinations of the aspects, the axis of rotation of the belt pulley may be an axis of rotation of an electric motor/generator unit.

In any of the aspects or combinations of the aspects, the first and second tensioning pulleys may be configured to be pivoted about a third axis fixed relative to the belt drive by links.

In any of the aspects or combinations of the aspects, the third axis may be the axis of rotation of the belt pulley, the belt pulley coupled to an electric motor/generator unit.

In any of the aspects or combinations of the aspects, where the second spring device may be coupled to at least one of the first and second tensioning pulleys via a ratchet device.

In any of the aspects or combinations of the aspects, the path contours may have a circular arc-shape.

In any of the aspects or combinations of the aspects, the first and second axes may be guided along a straight path contour by linear guides.

In any of the aspects or combinations of the aspects, the path contours may be equal.

In any of the aspects or combinations of the aspects, the first spring device may have a lower spring constant than the second spring device, and the first spring device may be designed to apply a predetermined initial spring force while allowing for tolerances and friction in the initial position.

In any of the aspects or combinations of the aspects, at least one of the first spring device and the second spring device may include a spring damper arrangement.

In any of the aspects or combinations of the aspects, when a distance between the first and second tensioning pulleys increases a spring force of the second spring device may correspondingly increase.

In any of the aspects or combinations of the aspects, where the first spring device may be coupled a first attachment arm coupled to the first tensioning pulley at a first axis; and the first spring device may be coupled to a second attachment arm coupled to the second tensioning pulley at a second axis.

In any of the aspects or combinations of the aspects, a first end of the second spring device may be coupled to the first attachment arm and the second spring device may be coupled to the second attachment arm at a second end via a ratchet device configured to lock when the distance between the first and second tensioning pulleys increases.

In any of the aspects or combinations of the aspects, the tensioning pulley arrangement may further include a spring damper arrangement including a spring damper coupled to at least one of the first spring device and the second spring device.

In any of the aspects or combinations of the aspects, the belt may be coupled to a first belt pulley and a second belt pulley, the first belt pulley receiving rotational input from an ancillary unit and the second belt pulley receiving rotational input from an electric motor/generator unit.

In any of the aspects or combinations of the aspects, the first tensioning pulley may be rotatable about a first axis and where the second tensioning pulley is rotatable about a second axis, and where the first and second axes are parallel to one another and each can be moved along path contours which extend parallel to a plane perpendicular to the first and second axes.

In any of the aspects or combinations of the aspects, the belt drive may be used in a hybrid vehicle including an electric motor/generator unit and an internal combustion engine.

FIGS. 1, 2, 3A, and 4A show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A tensioning pulley arrangement for a belt drive, comprising:
   a first tensioning pulley rotatable about a first axis, the first tensioning pulley interacting with a first strand of a belt of the belt drive to tension the first strand; and
   a second tensioning pulley rotatable about a second axis, the second tensioning pulley interacting with a second strand of the belt to tension the second strand;
   where the first and second axes are parallel to one another and can be moved at a constant or variable distance from one another along path contours, which extend parallel to a plane perpendicular to the first and second axes;
   where the first and second tensioning pulleys are placed against the belt with a spring force and a spring preloading relative to one another by a first spring device, and the first and second axes are arranged at a distance from one another in an initial position;
   where the tensioning pulley arrangement has an intensifying device for increasing the spring force; and
   where the intensifying device includes: a tensioning device,
   which tensions the first spring device to an increasing extent, in the event of a movement of a central point of the distance from its rest position, with increasing movement of the central point, where the first spring device has a first spring and a second spring, arranged in series, and the tensioning device includes a crank, where the first spring and the second spring are coupled in each case by one of their ends to one of the first and second axes and are coupled to the crank by crank-facing ends, and the crank is configured to move in the event of a movement of the central point out of its rest position, tensioning the first spring and the second spring.

2. The tensioning pulley arrangement of claim 1, where the belt is wrapped at least partially around a belt pulley along its path between the first and second tensioning pulleys, where the belt pulley has an axis of rotation parallel to the first and second axes and where the belt pulley is configured to be subjected to a driving torque or a braking torque.

3. The tensioning pulley arrangement of claim 2, where the crank is supported by a lever such that the lever is pivotable about a lever pivot axis fixed relative to the belt drive.

4. The tensioning pulley arrangement of claim 3, where the axis of rotation of the belt pulley is an axis of rotation of an electric motor/generator unit.

5. The tensioning pulley arrangement of claim 2, where the first and second tensioning pulleys are configured to be pivoted about a third axis fixed relative to the belt drive by links.

6. The tensioning pulley arrangement of claim 5, where the third axis is the axis of rotation of the belt pulley, the belt pulley coupled to an electric motor/generator unit.

7. The tensioning pulley arrangement of claim 1, where the path contours have a circular arc-shape.

8. The tensioning pulley arrangement of claim 1, where the first and second axes are guided along a straight path contour by linear guides.

9. The tensioning pulley arrangement of claim 1, where the path contours are equal.

10. A belt drive, comprising:
    a tensioning pulley arrangement, including;
       a first tensioning pulley rotatable about a first axis, the first tensioning pulley interacting with a first strand to tension the first strand; and
       a second tensioning pulley rotatable about a second axis, the second tensioning pulley interacting with a second strand of a belt of the belt drive to tension the second strand;
       where the first and second axes are parallel to one another and can be moved at a constant or variable distance from one another along path contours, which extend parallel to a plane perpendicular to the first and second axes;
       where the first and second tensioning pulleys are placed against the belt with a spring force and a spring preloading relative to one another by a first spring device, and the first and second axes are arranged at a distance from one another in an initial position;
       where the tensioning pulley arrangement has an intensifying device for increasing the spring force; and
       where the intensifying device includes: a tensioning device,
       which tensions the first spring device to an increasing extent, in the event of a movement of a central point of the distance from its rest position, with increasing movement of the central point, where the first spring device has a first spring and a second spring, arranged in series, and the tensioning device is a crank, where the first spring and the second spring are coupled in each case by one of their ends to one of the first and second axes and are coupled to the crank by crank-facing ends, and the crank is configured to move in the event of a movement of the central point out of its rest position, tensioning the first spring and the second spring.

* * * * *